US009452655B2

(12) United States Patent
Hiebert et al.

(10) Patent No.: US 9,452,655 B2
(45) Date of Patent: Sep. 27, 2016

(54) ELECTRONIC HEIGHT CONTROL FOR RECREATIONAL VEHICLES

(71) Applicant: VALID MANUFACTURING LTD., Salmon Arm (CA)

(72) Inventors: Grant W. Hiebert, Salmon Arm (CA); Jack W. Fenkhuber, Salmon Arm (CA)

(73) Assignee: Valid Manufacturing Ltd., Salmon Arm, British Columbia (CA)

( * ) Notice: Subject to any disclaimer, the term of this patent is extended or adjusted under 35 U.S.C. 154(b) by 29 days.

(21) Appl. No.: 14/133,569

(22) Filed: Dec. 18, 2013

(65) Prior Publication Data

US 2014/0172233 A1    Jun. 19, 2014

Related U.S. Application Data

(60) Provisional application No. 61/738,796, filed on Dec. 18, 2012.

(51) Int. Cl.
| | |
|---|---|
| *B60G 17/016* | (2006.01) |
| *B60G 17/015* | (2006.01) |
| *B60G 17/017* | (2006.01) |
| *B60G 17/052* | (2006.01) |

(52) U.S. Cl.
CPC ......... *B60G 17/0162* (2013.01); *B60G 17/017* (2013.01); *B60G 17/0155* (2013.01); *B60G 17/0161* (2013.01); *B60G 17/0164* (2013.01); *B60G 17/0525* (2013.01); *B60G 2400/252* (2013.01); *B60G 2500/302* (2013.01); *B60G 2800/012* (2013.01); *B60G 2800/014* (2013.01); *B60G 2800/70* (2013.01); *B60G 2800/914* (2013.01)

(58) Field of Classification Search
CPC .......... B60G 17/0155; B60G 17/0161; B60G 17/0164; B60G 17/017; B60G 17/0525; B60G 17/0162; B60G 2800/914; B60G 2800/70
See application file for complete search history.

(56) References Cited

U.S. PATENT DOCUMENTS

| | | | | |
|---|---|---|---|---|
| 4,923,210 | A | * | 5/1990 | Heider et al. ............... 280/6.153 |
| 5,005,858 | A | | 4/1991 | Torrielli et al. |
| 5,141,245 | A | | 8/1992 | Kamimura et al. |
| 5,287,277 | A | | 2/1994 | Mine et al. |
| 5,294,146 | A | | 3/1994 | Tabata et al. |
| 5,322,321 | A | * | 6/1994 | Yopp ......................... 280/6.158 |

(Continued)

OTHER PUBLICATIONS

U.S. Appl. No. 07/407,189, Nakano et al.

*Primary Examiner* — Mussa A Shaawat
(74) *Attorney, Agent, or Firm* — Antony C. Edwards

(57) ABSTRACT

A ride height control system includes a velocity monitor, corner ride height sensors, a processor receiving height inputs from the height sensors and velocity inputs from the velocity monitor. A cross-flow averager cooperates between the front airbags and is in communication with the processor. The cross-flow averager and the processor cooperate with the height sensors corresponding to the front corners, so as to provide a single pseudo height controller controlling, by selective actuation of the cross-flow averager, airflow between the corresponding front corners. The velocity monitor monitors forward velocity of the vehicle and provides velocity information to the processor. The processor causes the cross-flow averager to isolate the front airbags when the velocity is above a non-zero pre-set velocity and to allow a cross-flow of the airflow between the front airbags below the pre-set velocity. The pre-set velocity may be a range of velocities.

8 Claims, 11 Drawing Sheets

(56) References Cited

U.S. PATENT DOCUMENTS

| | | | |
|---|---|---|---|
| 5,344,189 A * | 9/1994 | Tanaka et al. | 280/6.152 |
| 5,465,209 A | 11/1995 | Sammut et al. | |
| 5,466,007 A * | 11/1995 | Smith | 280/6.157 |
| 5,484,162 A * | 1/1996 | Kanoh et al. | 280/6.157 |
| 5,601,307 A | 2/1997 | Heyring et al. | |
| 6,157,879 A * | 12/2000 | Kwack et al. | 701/37 |
| 6,161,845 A | 12/2000 | Shono et al. | |
| 6,293,562 B1 * | 9/2001 | Kutscher | 280/6.159 |
| 6,418,363 B2 | 7/2002 | Cochofel et al. | |
| 6,665,597 B1 * | 12/2003 | Hanser et al. | 701/37 |
| 7,040,632 B2 | 5/2006 | Burdock et al. | |
| 7,066,474 B2 | 6/2006 | Hiebert et al. | |
| 7,226,057 B2 | 6/2007 | Eichhorn et al. | |
| 7,334,801 B2 * | 2/2008 | Hohmann | 280/5.518 |
| 7,761,205 B2 * | 7/2010 | Onuma et al. | 701/36 |
| 7,806,417 B1 * | 10/2010 | Hanser et al. | 280/5.514 |
| 2003/0038442 A1 * | 2/2003 | Chernoff et al. | 280/124.1 |
| 2004/0061293 A1 | 4/2004 | Barbison | |
| 2005/0090956 A1 * | 4/2005 | Ogawa | 701/37 |
| 2005/0093265 A1 | 5/2005 | Niaura et al. | |
| 2005/0161891 A1 * | 7/2005 | Trudeau et al. | 280/5.507 |
| 2005/0173881 A1 | 8/2005 | Harrison et al. | |
| 2006/0064223 A1 * | 3/2006 | Voss | 701/52 |
| 2007/0120334 A1 * | 5/2007 | Holbrook | 280/6.157 |
| 2007/0168092 A1 * | 7/2007 | Knox et al. | 701/37 |
| 2008/0021611 A1 | 1/2008 | Hiebert et al. | |
| 2009/0033044 A1 * | 2/2009 | Linsmeier | 280/5.514 |
| 2010/0152969 A1 * | 6/2010 | Li et al. | 701/37 |
| 2014/0107892 A1 * | 4/2014 | Coombs et al. | 701/40 |

* cited by examiner

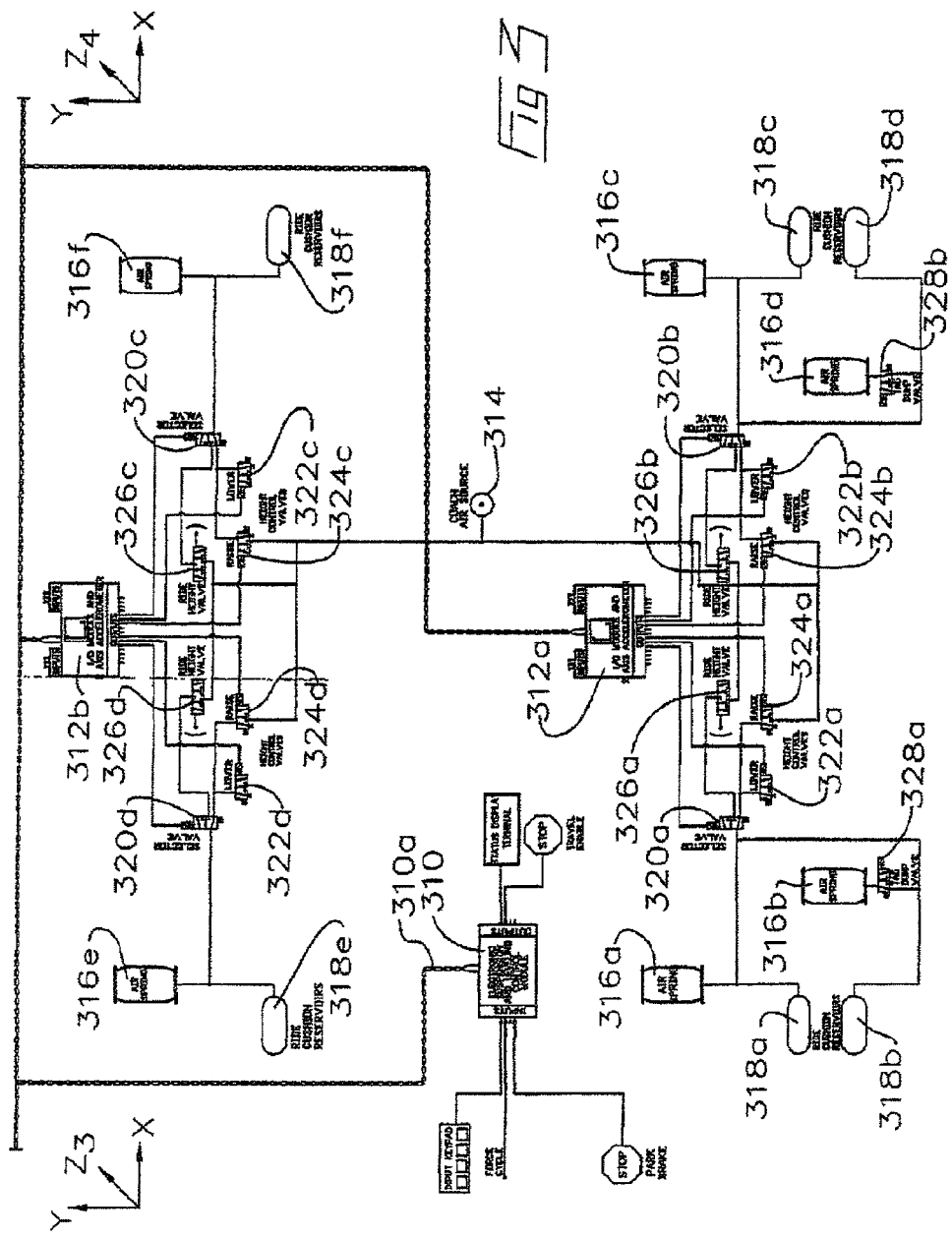

ELECTRONIC HEIGHT CONTROL FOR RECREATIONAL VEHICLES

CROSS REFERENCE TO RELATE APPLICATIONS

This application claims priority from U.S. provisional application No. 61/738,796 filed Dec. 18, 2012, and entitled Electronic Height Control for Recreational Vehicles.

FIELD OF THE INVENTION

This invention relates to the field of control systems for classes of coach vehicles referred to as recreational vehicles, wherein vehicles of this class employ air suspension systems, and in particular to an improved method and apparatus for switching between height modes control while a coach is travelling.

BACKGROUND

In the prior art applicant is aware of U.S. Pat. No. 7,066,474 which issued Jun. 27, 2006, entitled Electronic Suspension and Level Control System for Recreational Vehicles, Applicant is also aware of published United States patent application entitled Method and Apparatus for Controlling Ride Height and Levelling of a Vehicle Having Air Suspension which published on Jan. 24, 2008, under publication number US 2008/0021611.

SUMMARY

In summary the ride height control system described herein for a vehicle having air suspension, including front and rear corner airbags in the four corners of the vehicle, may be characterized in one aspect as including a velocity monitor, ride height sensors, a processor receiving height inputs from the height sensors and velocity inputs from the velocity monitor, and a cross-flow averager cooperating between the front airbags and in communication with the processor. The front and rear corner airbags include at least one selectively inflatable and selectively deflatable airbag for mounting in each corner of the four corners of the vehicle. The four corners of the vehicle are defined as including the front left and front right corners and the rear left and rear right corners. The ride height sensors are mounted one in each corner of the four corners of the vehicle. The cross-flow averager and the processor cooperate with at least the height sensors corresponding to at least the front corners, so as to provide a single pseudo height controller controlling, by selective actuation of the cross-flow averager, airflow between the corresponding front corners. The velocity monitor monitors forward velocity of the vehicle and provides velocity information to the processor. The processor is adapted to cause the cross-flow averager to isolate the front airbags in both of the front corners when the velocity is above a non-zero pre-set forward velocity and to allow a cross-flow of the airflow between the airbags in both of the front corners below the pre-set forward velocity.

The pre-set forward velocity may advantageously include pre-set first and second velocities, wherein the front airbags are isolated by the cross-flow averager when the velocity is above or substantially equal to said first velocity and wherein said cross-flow averager allows said cross-flow when said forward velocity is below or substantially equal to the second velocity, wherein the first velocity is greater than the second velocity.

In one embodiment the cross-flow averager includes at least one selectively actuable cross-over valve and corresponding air supply lines mounted so as to selectively share pressurized air between the front airbags in the front corners.

In a preferred embodiment, not intended to be limiting, the first velocity is in the range of substantially 40 mph, and the second velocity is in the range of substantially 35 mph.

BRIEF DESCRIPTION OF THE DRAWINGS

FIGS. 1-9 illustrate the prior art from U.S. Pat. No. 7,066,474, and in particular:

FIG. 1 is a schematic view representing a chassis equipped with a mechanical spring front suspension system and a two axis method for controlling leveling.

FIG. 2 is a schematic view representing a chassis equipped with a single control air-spring type front suspension system and a three axis method for controlling levelling.

FIG. 3 is a schematic view representing a chassis equipped with a dual control air-spring type front suspension and a four axis method for controlling levelling.

FIGS. 4, 5 and 6 represent embodiments corresponding to FIGS. 1, 2, and 3, respectively, with the addition of anti-dive valves.

FIGS. 7, 8 and 9 represent embodiments corresponding to FIGS. 4, 5 and 6, respectively, with the deletion of selector valves and ride height valves, and the addition of ride-height sensors.

DETAILED DESCRIPTION OF EMBODIMENTS OF THE INVENTION

Figure 10:
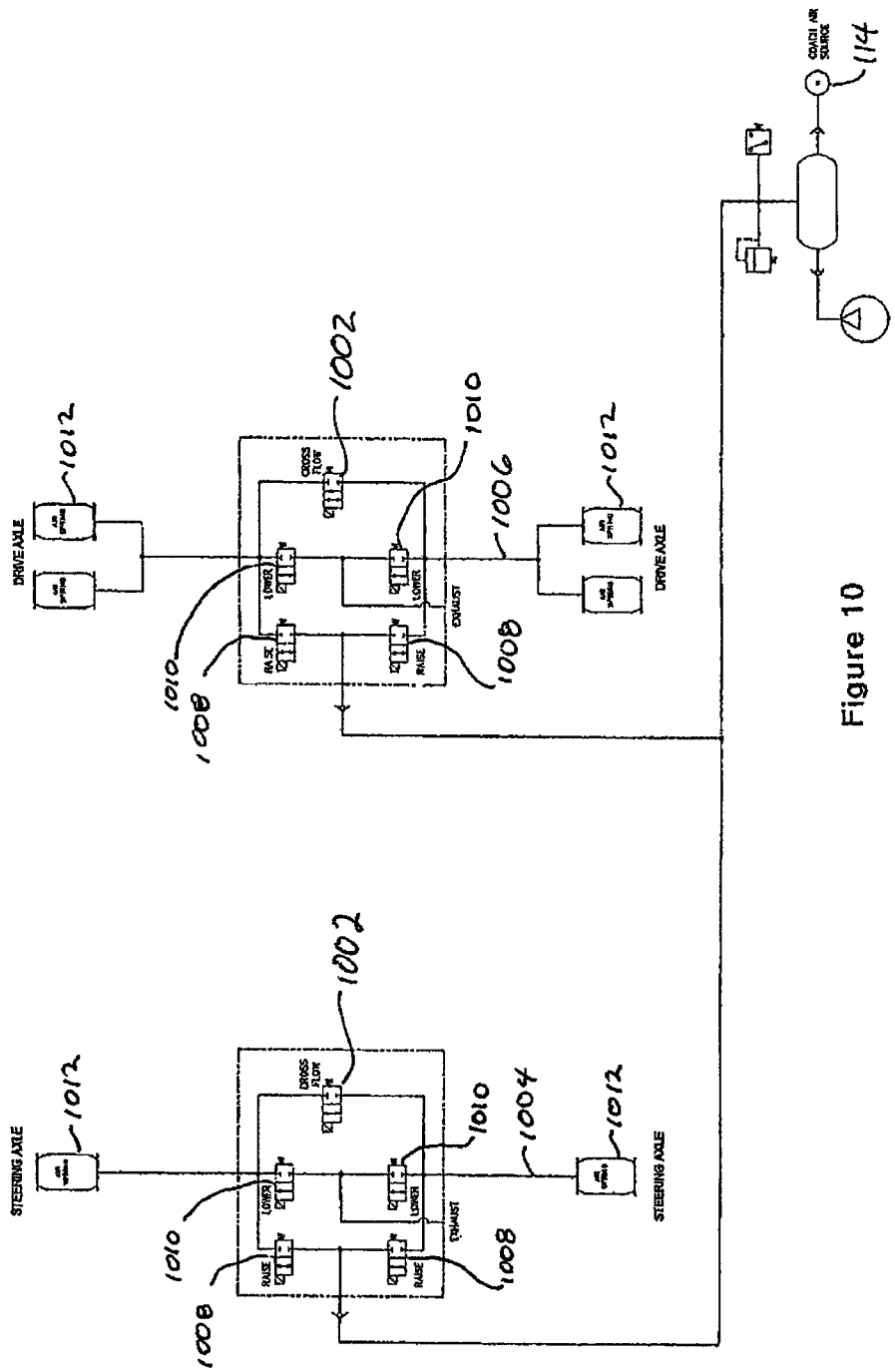
FIG. 10 illustrates an improved embodiment wherein four height control sensors are provided, one in each corner of the vehicle, and wherein a cross-flow valve is provided in association with both the drive axle and the steering axle of the vehicle to allow dynamic switching in and by the control mode between a four vehicle height sensor system and a vehicle height sensor system which emulates a three vehicle height sensor system using a pseudo sensor which averages a pair of the four vehicle height sensors.

What follows, prior to the description corresponding to FIG. 10, is the description from U.S. Pat. No. 7,066,474, also incorporated herein by reference.

Figure 1:
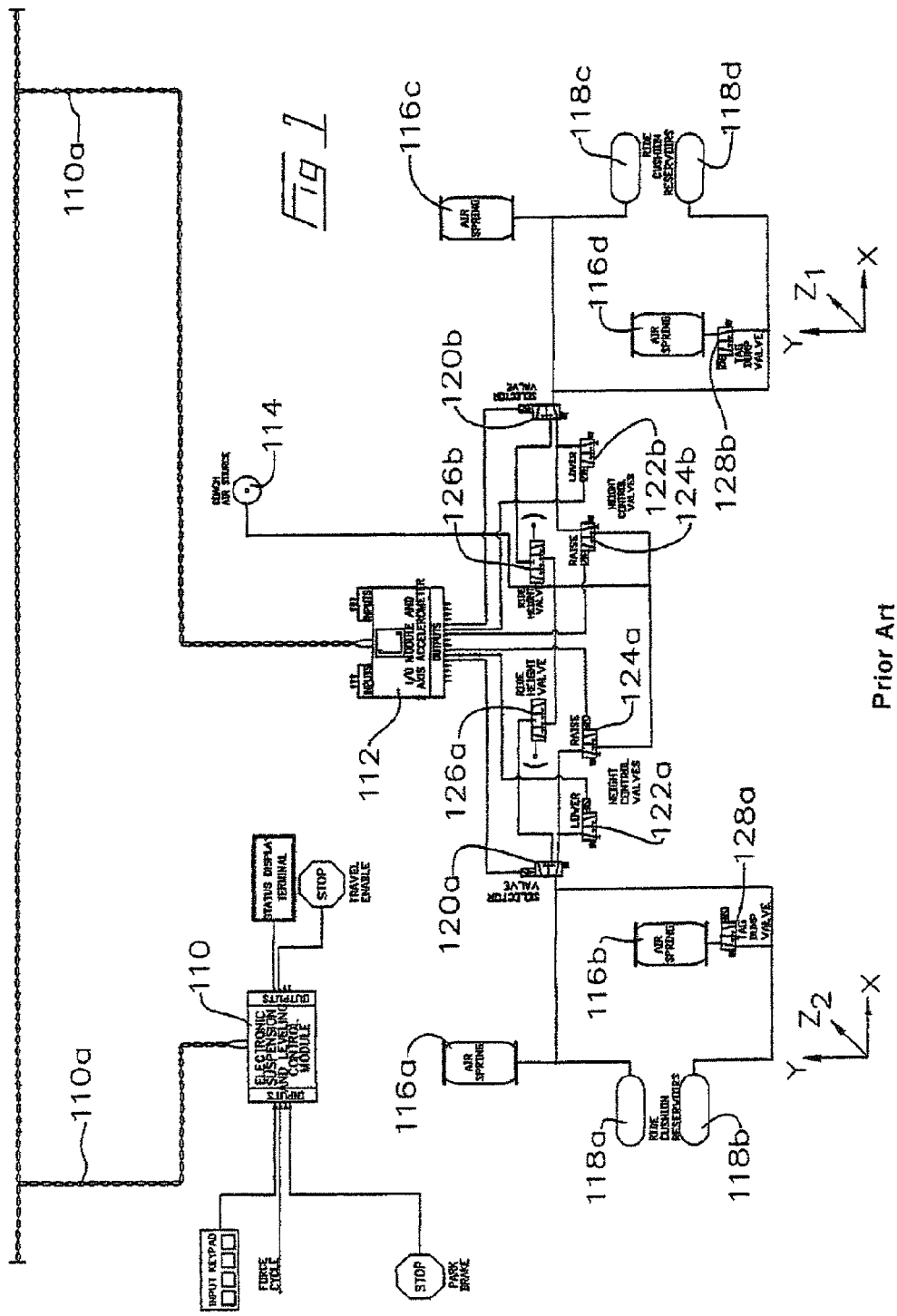

In FIG. 1, air from coach air source 114 is introduced into left rear air-springs 116a and 116b, right rear air-springs 116c and 116d, left rear ride cushion reservoirs 118a and 118b, and right rear side cushion reservoirs 118c and 118d. Air-springs 116a, 116b, 116c and 116d expand and contract in response to the opening and closing of height control valves 122a, 122b, 124a and 124b, thereby controlling the height of the vehicle, in particular the height of each rear corner of the vehicle along two vertical axes Z and $Z_2$ corresponding to each rear corner. A control module 110 is connected to an I/O module and X, Y axis accelerometers 112. The I/O module is connected to selector valves 120a and 120b and to height control valves 122a, 122b, 124a, and 124b. Tag dump valves 128a and 128b serve to vent the corresponding airbag located in the tag axle suspension, thereby to effectively transfer its load to the drive axle in order to increase traction. Height control valves 122a and 122b, each labelled "LOWER", vent air from the corresponding air-springs 116a d.

FIG. 2 shows the chassis of FIG. 1 with the addition of front I/O module and accelerometer 212b, which is connected to front selector valve 220c and front height control valves 222c and 224c. Front left and right air-springs 216e and 216f, and front left and right ride-cushion reservoirs 218e and 218f are also added. This additional single pneumatic circuit provides for collectively (that is not independently) raising and lowering the front corners of the vehicle along a notional third vertical axis $Z.sub.3$.

Figure 3:
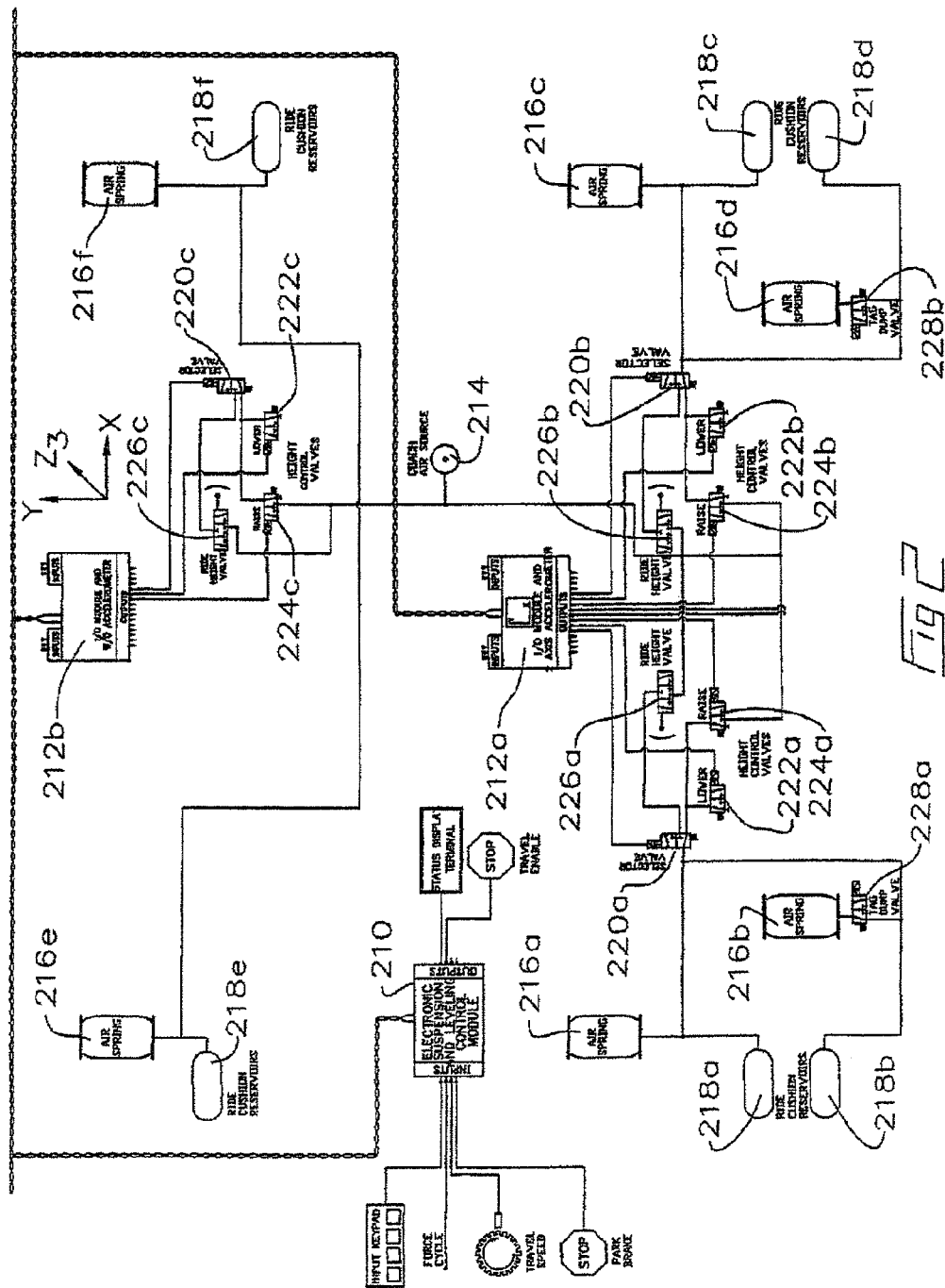

FIG. 3 shows the chassis shown in FIG. 2 plus additional front selector valve 320d, front height control valves 322d and 324d, and front ride height valve 326d. This provides a second pneumatic circuit controlling the front air-springs so that the left front air-springs may be independently actuated notionally along axis $Z.sub.3$, independently of right front air-springs notionally along axis $Z.sub.4$.

Figure 4:
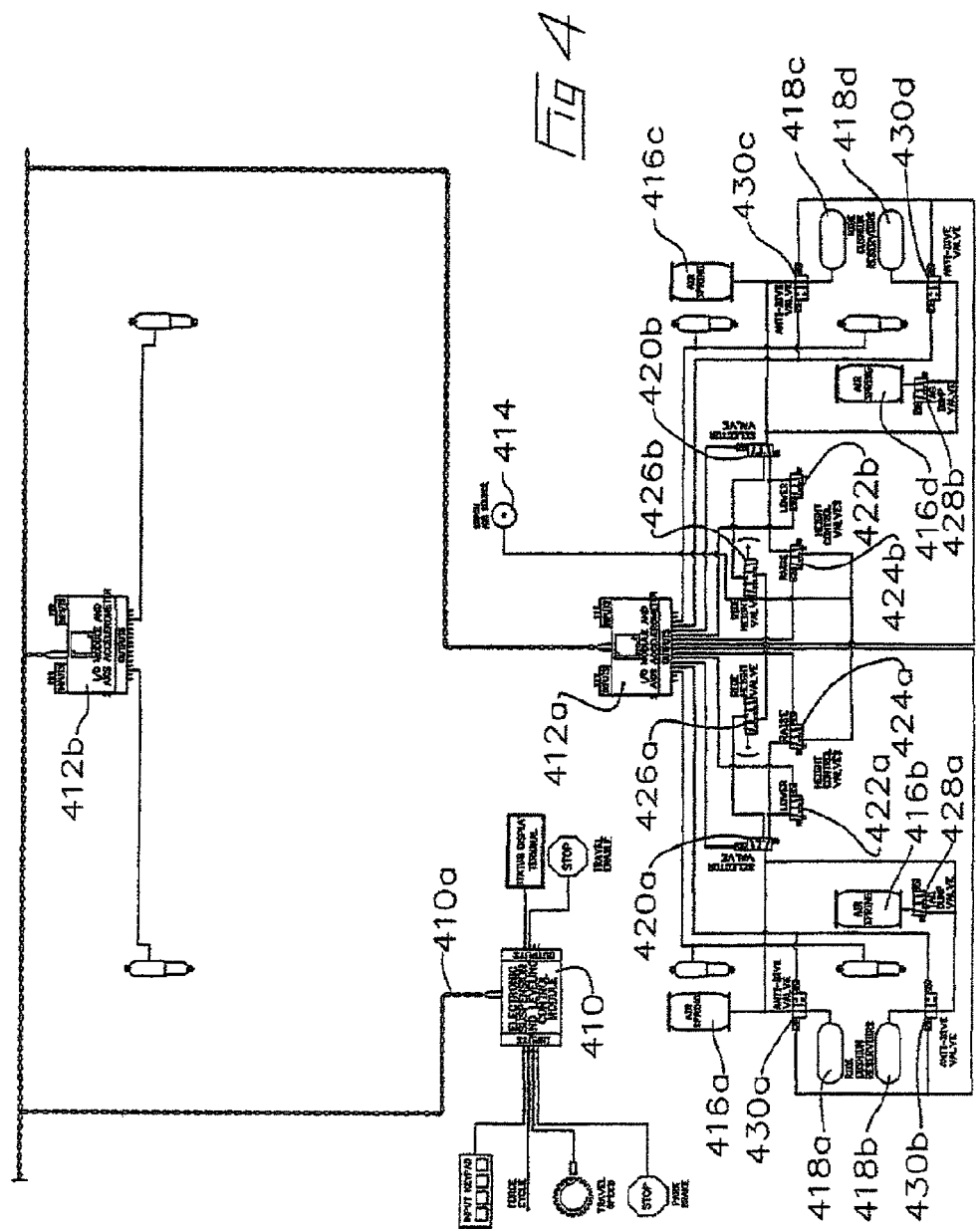

FIG. 4 shows the chassis shown in FIG. 1 plus rear left anti-dive valves 430a and 430b and rear right anti-dive valves 430c and 430d.

Figure 5:
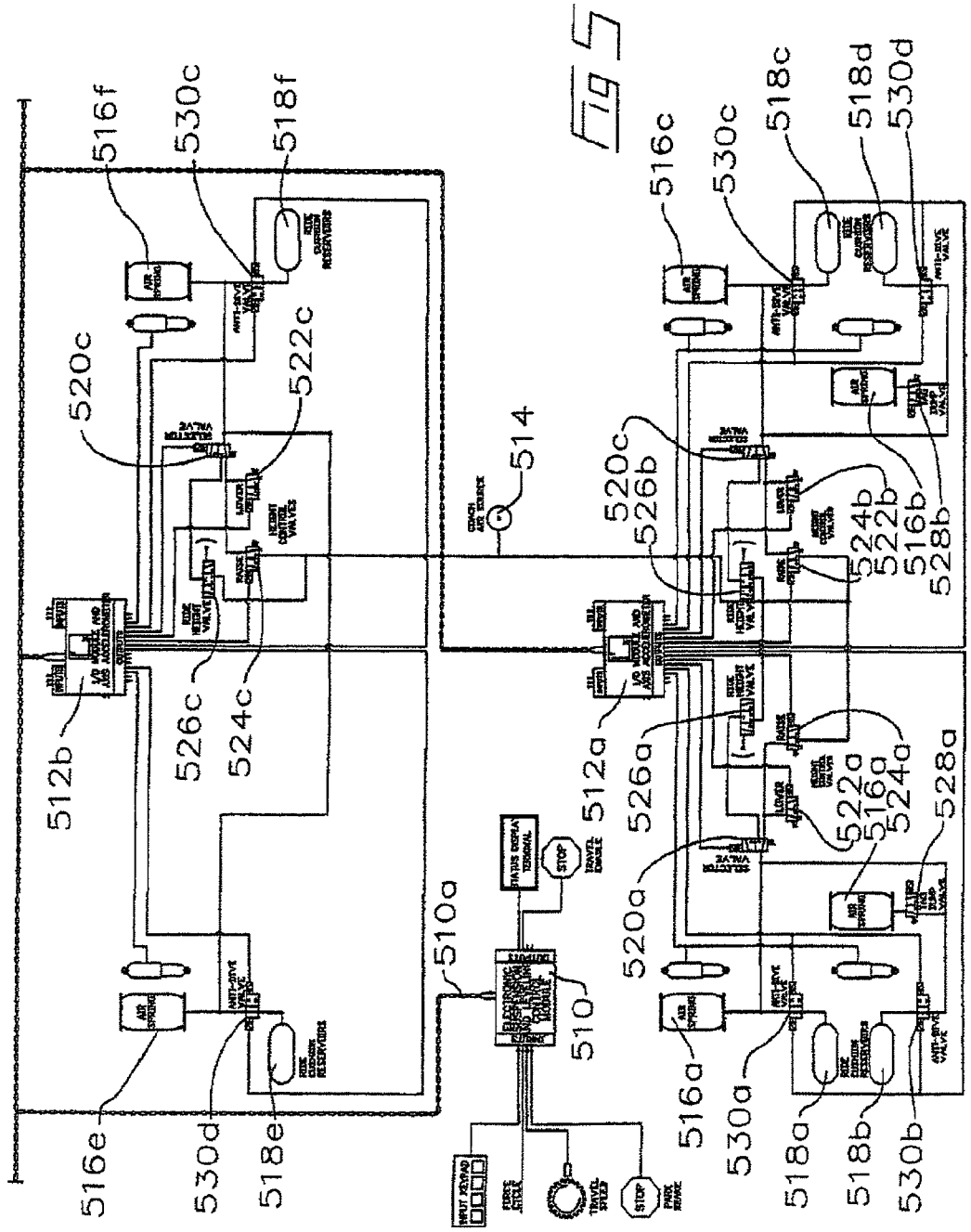

FIG. 5 shows the chassis shown in FIG. 2 plus the anti-dive valves shown in FIG. 4 and additional front left anti-dive valve 530d and front right anti-dive valve 530e.

Figure 6:
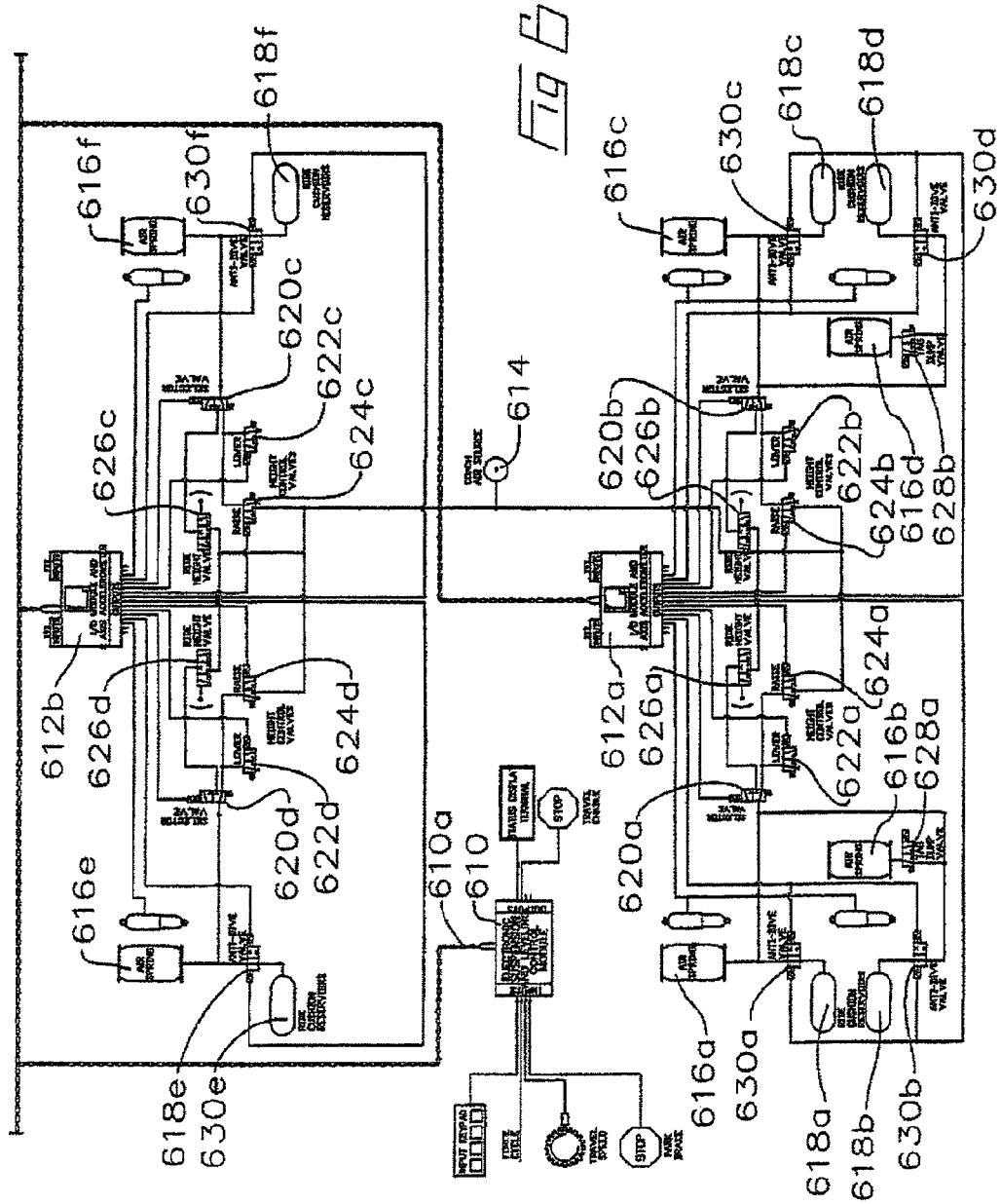

FIG. 6 shows the chassis shown in FIG. 3 plus the anti-dive valves shown in FIG. 5.

Figure 7:
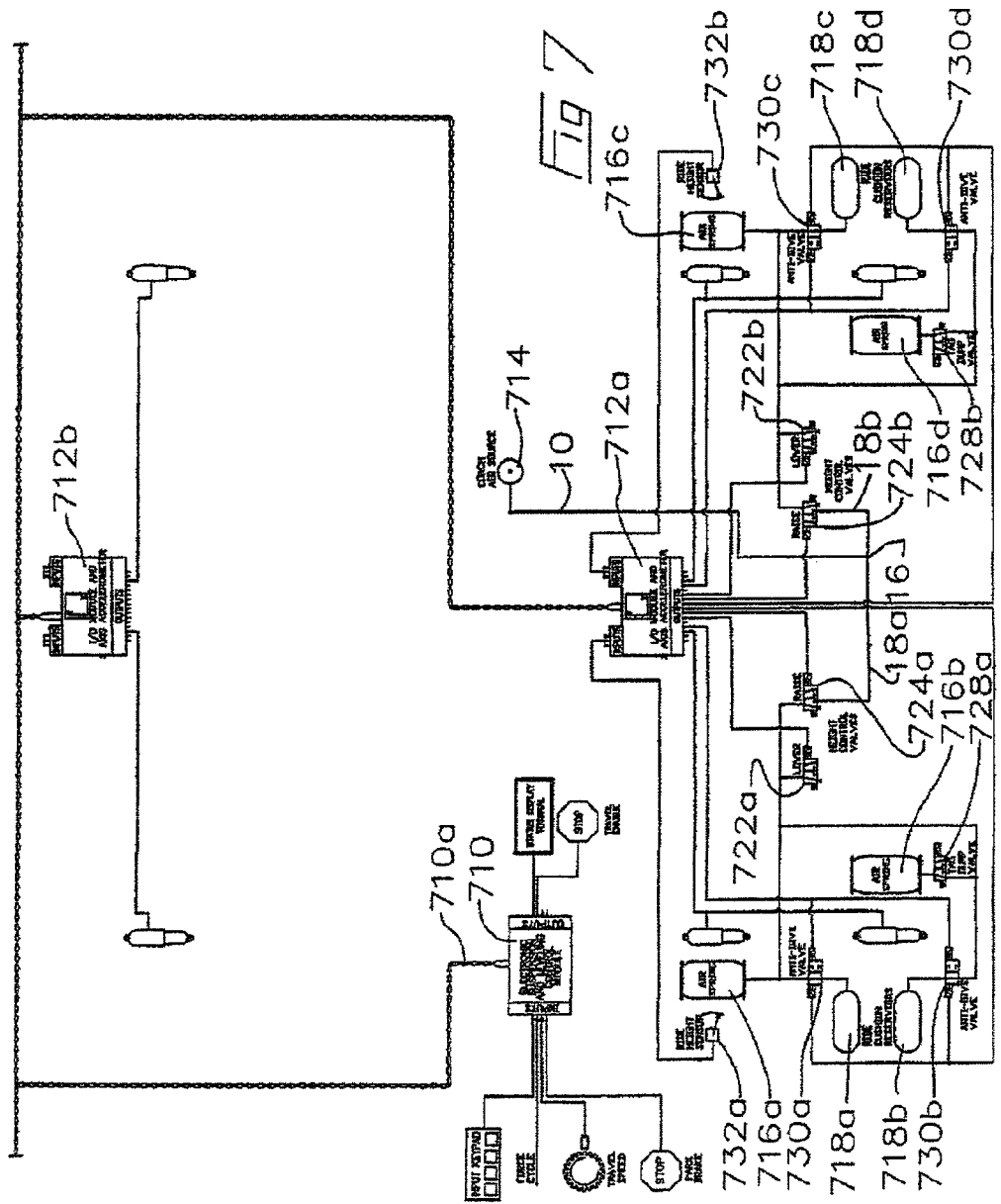

FIG. 7 shows the chassis shown in FIG. 4 without ride height valves. Left rear ride height sensor 732a and right rear right height sensor 732b are added, each diagrammatically illustrated as interposed between the upper and lower ends of the corresponding air-spring but intended to be mounted to an arm, strut etc which rotates relative to the chassis as the chassis moves vertically relative to the ground. The height sensors detect the vehicle, that is chassis height and output a signal representative of the detected vehicle height. The detected vehicle height is then compared by the control module processor to the desired or required vehicle height and the requisite adjustment made, if any, by sending the corresponding signals to open or close the raise or lower height control valves.

Figure 8:
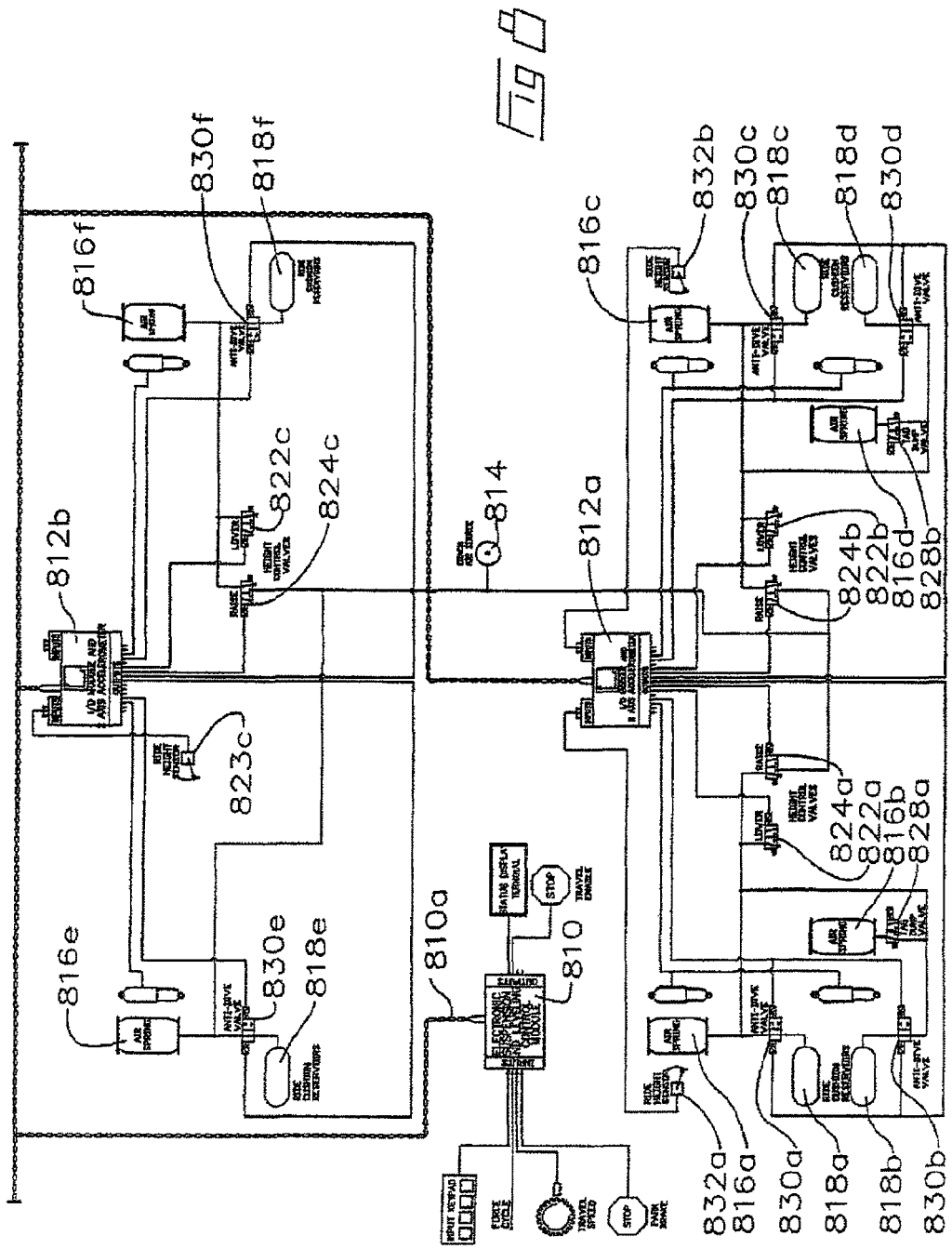

FIG. 8 shows the chassis shown in FIG. 5, without ride height valves and associated lines. Their function is replaced by ride height sensors such as incorporated into FIG. 7, plus an additional front ride height sensor 832c to detect, collectively, the height of the front of the vehicle from the ground.

Figure 9:
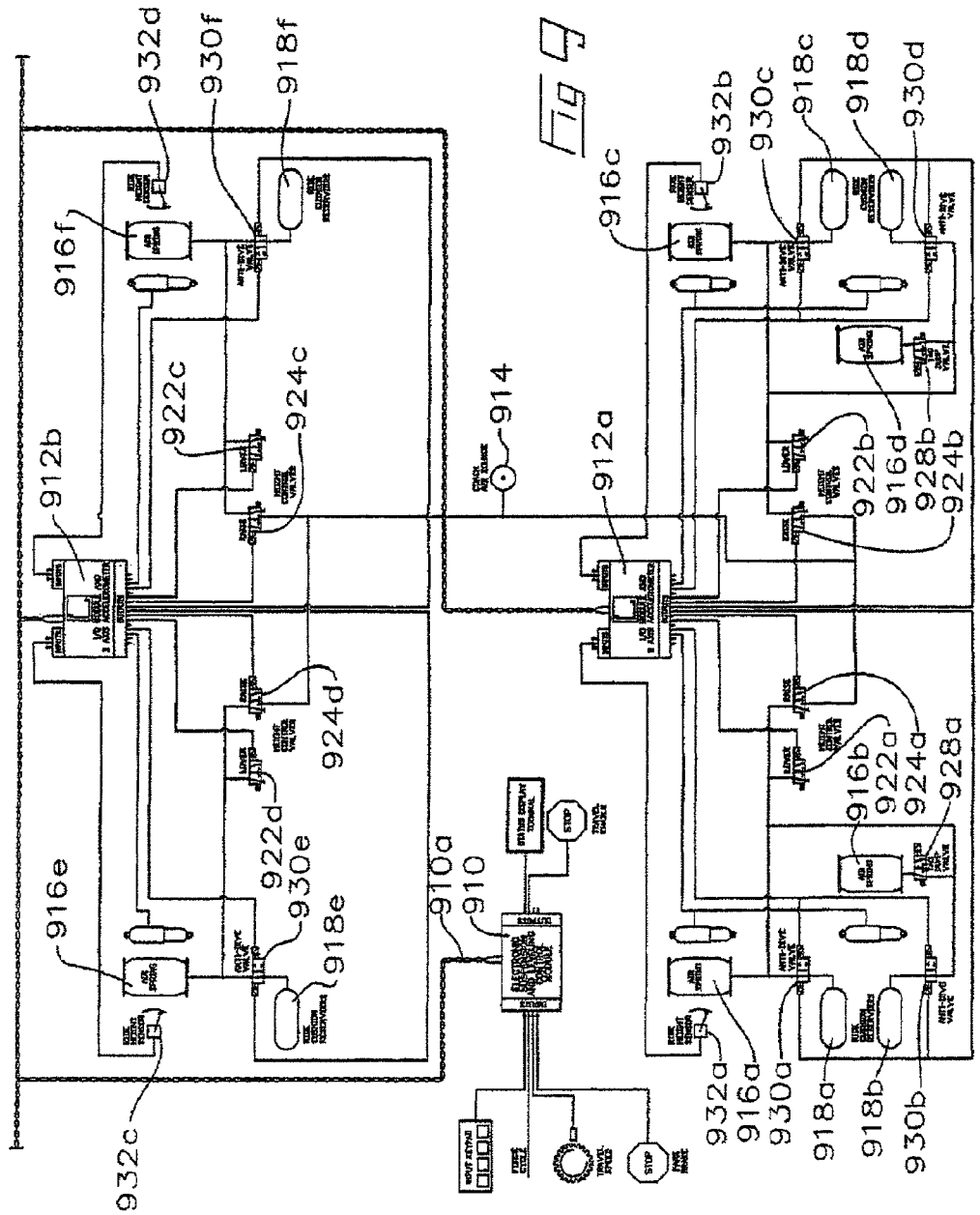

FIG. 9 shows the chassis shown in FIG. 6 without ride height valves and associated lines. Ride height sensors such as incorporated into FIG. 8 replace the function of the ride height valves. An additional front ride height sensor 932d is added to provide for independent left and right adjustment of the height of the front corners.

Figure 1A:
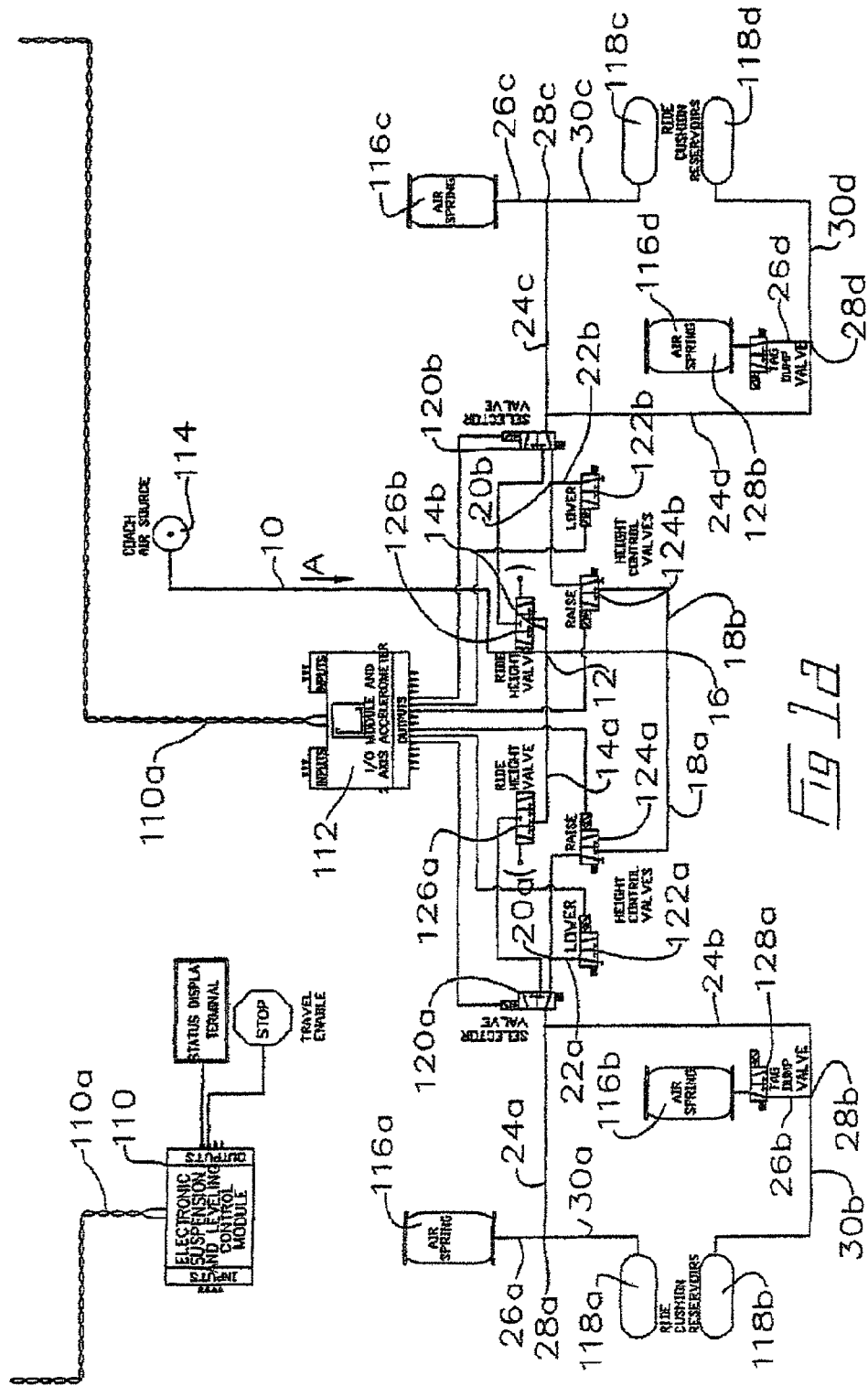
FIG. 1a is an enlarged view of a portion of FIG. 1.

In use, as illustrated in FIG. 1a, pressurized air flow is provided by air source 114 so as to flow in direction A along line 10. Line 10 branches at junction 12 into lines 14a and 14b. Line 10 terminates at T-junction 16, splitting into lines 18a and 18b. Flow through lines 14a and 14b is controlled by valves 126a and 126b respectively. Flow through lines 18a and 18b is controlled by valves 124a and 124b respectively. Lines 18a and 18b branch downstream of valves 124a and 124b respectively at junctions 20a and 20b into lines 22a and 22b. Lines 22a and 22b terminate at valves 122a and 122b respectively.

Lines 14a and 18a terminate downstream at selector valve 120a. Lines 14b and 18b terminate downstream at selector valve 120b. The biasing of selector valves 120a and 120b determines whether airflow from lines 14a and 14b respectively, or airflow from lines 18a and 18b respectively enter air-spring feed lines 24a 24d. Airflow in air-spring feed lines 24a 24d communicates with air-springs 116a 116d respectively via branch lines 26a 26d at junctions 28a 28d. Lines 30a 30d also branch from junctions 28a 28d respectively, and feed airflow to and from air cushion reservoirs 118a 118d respectively.

The biasing of valves 124a, 124b, 122a, 122b, and 120a, 120b is controlled by instructions from control module 110 via network bus 110a and I/O module 112. For example, in travel mode, valve 120a is biased to pass airflow between line 14a and lines 24a, 24b so that valve 126a regulates the airflow to air-springs 116a, 116b to adjust the ride height. During travel the shock absorbing resiliency of the air-springs is supplemented by air cushion reservoirs mounted in parallel, on lines 30a, 30b, with the air-springs. In modes permitting manual adjustment of the height of the RV above the ground (that is, adjusting the length or expansion of air-spring 116a), or in automatic modes, for example for automatic levelling of the RV while the RV is static, valve 120a is biased to pass airflow between line 18a and lines 24a, 24b so that valves 122a, 124a regulates the airflow to (in the case of valve 124a) and from (in the case of valve 122a) air-springs 116a, 116b to adjust the height of the RV chassis in the corresponding corner, in this case the left rear. Opening valve 124a raises the corner by expanding the air-springs. Opening valve 122a lowers the corners by venting air from the air-springs.

As may be seen, the ride height valve 126a and associated branch line 14a, and the raise valve 124a of the height control valves on branch line 18a form a first kind of parallel pneumatic circuit between junction 12 and selector valve 120a. Thus, the outputs from the I/O module 112 which control the biasing of selector valve 120a will regulate which of the two parallel branches of the first kind of parallel pneumatic circuit will govern the downstream actuation of the air-springs 116a, 116b. The use of a parallel pneumatic circuit downstream from a pressurized air source which incorporates two branches, one of which provides for ride height control, and the other of which provides for static height control, the operative branch depending on the biasing of a selector valve common to the two branches, for downstream actuation of one or more air-springs, is the basic pneumatic circuit upon which the illustrated embodiments of FIGS. 1 6 are based. Thus in FIG. 1, two such "first kind" of pneumatic circuits, also parallel to each other, are employed to independently control the height of the left rear corner of the vehicle chassis (see the pneumatic circuit where the parallel branches are lines 14a and 18a), and the right rear corner of the vehicle chassis (see the pneumatic circuit where the parallel branches are lines 14b and 18b).

The use of the same kind of parallel pneumatic circuits are employed as the building blocks in the further embodiments of FIGS. 2-6. In particular, in FIG. 2, a further single pneumatic circuit having parallel branches which respectively include ride height valve 226c and height control raising valve 224c extend in parallel between air source 214 and selector valve 220c. This single pneumatic circuit then governs the raising and lowering collectively of the left and right forward corners of the vehicle's chassis. In the embodiment of FIG. 3, the left and right forward corners are independently elevated and lowered by the use of two of the parallel pneumatic circuits such as employed for the left and right rear corners, the pneumatic circuits in FIG. 3 for the left and right rear corners being the same as those in FIGS. 1 and 2. The commonality of components of the parallel pneumatic circuits between the various Figures is indicated by the last two digits of the reference numeral for a particular component. The first digit of the reference numeral for a particular component merely indicates the corresponding Figure number. Thus for example, selector valve 120*b* in FIG. 1 is the same component as selector valve 320*b* in FIG. 3; the difference in numbering merely indicating that component 120*b* comes from the embodiment of FIG. 1 and component 320*b* comes from the embodiment of FIG. 3.

FIGS. 4, 5 and 6 repeat the build up of the number of parallel pneumatic circuits in the same sequence as found in FIGS. 1, 2 and 3 so that in FIG. 4, as in FIG. 1, only two parallel pneumatic circuits are employed, those being to independently control the height of the rear corners of the vehicle chassis. In FIG. 5, as in FIG. 2, a third parallel pneumatic circuit is added to control the height, collectively, of the front corners of the vehicle chassis. In FIG. 6, as in FIG. 3, a further parallel pneumatic circuit is added to the front of the vehicle so that the height of each of the four corners of the vehicle chassis are independently controlled by their own parallel pneumatic circuit. As noted above, what is added to the embodiment of FIGS. 4-6 is suspension, for example such as the shock absorbers illustrated, corresponding to each of the air-springs.

Also what is added to the embodiments of FIGS. 4-6 is the use of anti-dive valves, in FIG. 4 labeled with reference numerals 430*a*, 430*b*, 430*c*, and 430*d*. Again, is understood that in FIGS. 5 and 6, following the nomenclature employed with FIGS. 1-3, the corresponding parts in FIG. 5 are labeled by reference numerals 530*a* 530*d*, and in FIG. 6 by reference numerals 630*a* 630*d*. The anti-dive valves are used to isolate the ride cushion reservoirs, in FIG. 4 labeled for reference 418*a* 418*d*. The air-springs and their corresponding reservoirs are in fluid communication in a parallel pneumatic circuit which forms the second kind of parallel pneumatic circuit found in the system according to the present invention.

Thus during straight and level translation, that is travel, or during mild maneuvering, the ride cushion reservoirs are left in open fluid communication with their corresponding air-springs, in FIG. 4 air-springs 416*a*-416*d*. Anti-dive valves 430*a*-430*d* are closed so as to isolate the ride cushion reservoirs and block the open fluid communication between the reservoirs and their corresponding air-springs upon their corresponding accelerometers, in FIG. 4 those in I/O module 412*a*, detecting a threshold longitudinal acceleration and/or lateral acceleration which, were the ride cushion reservoirs not isolated from their corresponding air-springs, would cause excessive corresponding pitch and/or roll of the recreational vehicle due to the extra resiliency provided by the pneumatic ride cushion reservoirs.

In FIGS. 7-9, the parallel pneumatic circuits of FIGS. 1-6 are modified to remove the branch lines corresponding to the ride height valves. Thus in the embodiment of FIG. 7, line 10 merely feeds into branch lines 18*a* and 18*b* via T-junction 16, through raise height control valves 724*a* and 724*b* to feed air flow into air-springs 716*a*-716*d*. The function of the ride height valves is replaced by the use of ride height sensors 732*a* and 732*b* providing data to control module 710 via I/O module 712*a* with the resulting height control signals from control module 710 being providing via I/O modules 712*a* to the height control valves, so as to open valves 724*a* and 724*b* and to close 722*a* and 722*b* when the height of the vehicle is to be increased, and conversely to close valves 724*a* and 724*b* and to open valves 722*a* and 722*b* when it is required to lower the height of the vehicle. Again, anti-dive valves, being in FIG. 7 anti-dive valves 730*a* 730*d*, are employed to isolate the air cushion reservoirs, being in FIG. 7 air cushion reservoirs 718*a* 718*d*, upon the detection of excessive pitch and/or roll by the accelerometers in I/O module 712*a*.

In FIG. 8, a further single pneumatic circuit containing a pair of raise and lower height control valves 824*c* and 822*c* respectively, in conjunction with ride height sensor 832*c* are employed to collectively control the left and right front corners of the vehicle. In FIG. 9 the height of the left and right front corners of the vehicle are independently controlled by their own separate pneumatic circuits through their corresponding height control valves 924*c*, 922*c* for the front right corner, and 924*d* and 922*d* for the front left corner. Again, each pneumatic circuit employs a corresponding anti-dive valve, in FIG. 9 anti-dive valves 930*a* 930*f*.

What follows is a description of the improvement according to one embodiment of the present invention with reference to FIG. 10:

As set out above, a number of ways are disclosed to control the height of a vehicle. Specifically, in FIG. 8 the system uses control sensors to measure the height of the vehicle suspension with a single sensor in the front and two in the rear. This is referred to herein as a three point or three sensor system. The air bags on each side of the front of the vehicle are paralleled and air is added or removed to the group of bags. In the rear, each side is treated independently. This effectively ensures that all air bags are supporting the vehicle at all times. The drawback of this system is that the front of the coach can lean as the coach corners, causing air from the high pressure side to transfer to the low pressure side allowing even more lean. It also means that the front of the coach will lean if there is any non-symmetrical loading in the front of the coach.

In FIG. 9 the system uses four height control sensors. This system alleviates most of the problems that stem from the three sensor system of FIG. 8. The problem with the four sensor system of FIG. 9 is that in certain situations, especially when parked, the ground under the coach may be so uneven that the four sensor system cannot successfully control the height at each corner. For example, if the tire at the front left of a vehicle is on a very high point, it may lift the entire front of the coach up because of the stiffness of the chassis design. The sensor on the right hand side my may now want to lower its corner but chassis stiffness prevents the corner from dropping. The system will end up releasing all of the air from the front right corner leaving the front left air bag(s) supporting the entire weight of the front of the vehicle.

Although the above described system uses height control sensors, the same problem may rise on a vehicle that uses conventional, mechanical height control valves (for example, as seen in which FIG. 5 shows a three valve system and in FIG. 6 shows a four valve system). The height control sensors and the height control valves are collectively referred to herein as height controllers.

If a vehicle is traveling at low speeds or is parked, a three height controller system is typically the best system to use. However, when the vehicle is traveling down the highway, a four height controller system is superior. Consequently, in one aspect of the present invention a four height control sensor system is used, but during low speed travel (or when parked) the front two height control sensors are averaged (the corresponding front air bags are paralleled) in order to create a pseudo single front height control sensor. The front air bags are averaged using a cross-flow averager, such as cross-flow valve, to in effect cause the overall system to act as a three sensor point system. Once the vehicle starts to travel and goes above a non-zero pre-set forward speed, control is dynamically switched, that is, the control mode is dynamically switched by the coach's processor (not shown) to four height controllers, preferably four height control sensors or other equivalents that accomplish the same function (collectively referred to herein as height control sensors), i.e. one height control sensor in each corner in order to better control the vehicle height at highway speeds. The processor monitors vehicle speed as input from a speed sensor. As the vehicle drops below a second pre-set speed, which is lower than the first pre-set speed, the processor reverts control back to a three sensor system. Typical speed ranges for the transitions may be for example 40 mph for the higher pre-set speed, and 35 mph for the lower pre-set speed.

A schematic of this system is seen illustrated in FIG. 10. When the cross flow valve 1002 is closed at each end of the vehicle, i.e. at both the front steering axle 1004 and at the rear drive axle 1006, the height of each corner can be controlled independently by its own corresponding raise or lower valves 1008 and 1010 respectively. If the cross flow 1002 at either end is opened, then all of the air bags 1012 at that end of the coach may be raised or lowered simultaneously. This allows for rapid switching between individual corner control on a given end of a vehicle and combined or pseudo single sensor height control on that same end.

What is claimed is:

1. A ride height control system for a vehicle having air suspension including front and rear corner airbags in all four corners of the vehicle, the system comprising, a velocity monitor, ride height sensors, a processor receiving height inputs from the ride height sensors and velocity inputs from the velocity monitor, and a cross-flow averager cooperating between the front airbags and in communication with the processor wherein said front and rear corner airbags include at least one selectively inflatable and selectively deflatable airbag for mounting in each corner of the four corners of the vehicle and wherein the four corners of the vehicle are the front corners including the front left and front right corners and the rear corners including the rear left and rear right corners, and wherein said ride height sensors are mounted one in each corner of the four corners of the vehicle, and wherein said cross-flow averager and said processor cooperate with at least said ride height sensors corresponding to at least the front corners so as to provide a single pseudo height controller controlling airflow between said corresponding front corner air bags, by selective actuation of said cross-flow averager, wherein said velocity monitor monitors velocity of the vehicle and provides velocity information to said processor, and wherein said processor is adapted to cause said cross-flow averager to prevent a cross-flow of the airflow between said front air bags in both of said front corners when said velocity is above a non-zero pre-set forward velocity and to allow a cross-flow of said airflow between said airbags in both of said front corners when said velocity is below said pre-set forward velocity, whereby selective actuation of said cross-flow averager enables control of the height of the front left and front right airbags either individually, or collectively by means of said single pseudo height controller.

2. The system of claim 1 wherein said pre-set forward velocity includes first and second velocities and wherein said cross-flow of airflow between said front airbags is prevented by said cross-flow averager when said velocity is above or substantially equal to said first velocity and wherein said cross-flow averager allows said cross-flow when said forward velocity is below or substantially equal to said second velocity, wherein said first velocity is greater than said second velocity.

3. The system of claim 2 wherein said cross-flow averager includes at least one selectively actuable cross-over valve and corresponding air supply lines mounted so as to selectively share pressurized air between said front airbags in the said front corners.

4. The system of claim 3 wherein said first velocity is in the range of substantially 40 mph, and wherein said second velocity is in the range of substantially 35 mph.

5. A method of ride height control comprising:
 (a) providing a ride height control system for a vehicle having air suspension including front and rear corner airbags in all four corners of the vehicle, the system comprising, a velocity monitor, ride height sensors, a processor receiving height inputs from the ride height sensors and velocity inputs from the velocity monitor, and a cross-flow averager cooperating between the front airbags and in communication with the processor wherein said front and rear corner airbags include at least one selectively inflatable and selectively deflatable airbag for mounting in each corner of the four corners of the vehicle and wherein the four corners of the vehicle are the front corners including the front left and front right corners and the rear corners including the rear left and rear right corners, and wherein said ride height sensors are mounted one in each corner of the four corners of the vehicle, and wherein said cross-flow averager and said processor cooperate with at least said ride height sensors corresponding to at least the front corners so as to provide a single pseudo height controller controlling airflow between said corresponding front corner air bags, by selective actuation of said cross-flow averager, wherein said velocity monitor monitors velocity of the vehicle and provides velocity information to said processor, and wherein said processor is adapted to cause said cross-flow averager to prevent a cross-flow of the airflow between said front air bags in both of said front corners when said velocity is above a non-zero pre-set forward velocity and to allow a cross-flow of said airflow between said airbags in both of said front corners when said velocity is below said pre-set forward velocity, whereby selective actuation of said cross-flow averager enables control of the height of the front left and front right airbags either individually, or collectively by means of said single pseudo height controller,
 (b) monitoring the velocity of the vehicle by said velocity monitor,
 (c) providing velocity information from said velocity monitor to said processor,
 (d) causing said cross-flow averager to prevent a cross-flow of said airflow between said front airbags in said front corners when said velocity is above said pre-set forward velocity, and,
 (e) allowing a cross-flow of said airflow between said front airbags in said front corners when said velocity is below said pre-set forward velocity.

6. The method of claim 5 wherein said pre-set forward velocity includes first and second velocities and wherein said cross-flow of airflow between said front airbags is prevented by said cross-flow averager when said velocity is above or substantially equal to said first velocity and wherein said cross-flow averager allows said cross-flow of said airflow when said forward velocity is below or substantially equal to said second velocity, wherein said first velocity is greater than said second velocity.

7. The method of claim 6 wherein said cross-flow averager includes at least one selectively actuable cross-over valve and corresponding air supply lines mounted so as to selectively share pressurized air between said front airbags in said front corners.

8. The method of claim 7 wherein said first velocity is in the range of substantially 40 mph, and wherein said second velocity is in the range of substantially 35 mph.

* * * * *